(12) United States Patent
Mao et al.

(10) Patent No.: US 12,100,073 B2
(45) Date of Patent: Sep. 24, 2024

(54) COLOR-BLIND COLOR INTERFACE DISPLAY METHOD, DEVICE AND STORAGE MEDIUM

(71) Applicant: SHENZHEN SKYWORTH-RGB ELECTRONIC CO., LTD., Shenzhen (CN)

(72) Inventors: Chaomin Mao, Shenzhen (CN); Xueming Zhang, Shenzhen (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 161 days.

(21) Appl. No.: 17/859,241

(22) Filed: Jul. 7, 2022

(65) Prior Publication Data
US 2023/0007973 A1 Jan. 12, 2023

(30) Foreign Application Priority Data
Jul. 7, 2021 (CN) .......................... 202110771038.9

(51) Int. Cl.
*G06T 11/00* (2006.01)
*G06T 7/90* (2017.01)
*H04N 1/60* (2006.01)

(52) U.S. Cl.
CPC .............. *G06T 11/001* (2013.01); *G06T 7/90* (2017.01); *H04N 1/60* (2013.01)

(58) Field of Classification Search
CPC ............ H04N 1/60; G06T 7/90; G06T 11/001
USPC ......................................................... 345/520
See application file for complete search history.

(56) References Cited

U.S. PATENT DOCUMENTS

| 6,985,524 B1 | 1/2006 | Borchers | |
| 2006/0061586 A1* | 3/2006 | Brulle-Drews | G06F 3/04897 345/594 |
| 2014/0340644 A1* | 11/2014 | Haine | A61B 3/066 351/239 |

(Continued)

FOREIGN PATENT DOCUMENTS

| CN | 106155483 A | 11/2016 |
| CN | 106354456 A | 1/2017 |

(Continued)

OTHER PUBLICATIONS

First Office Action issued in counterpart Chinese Patent Application No. 202110771038.9, dated Mar. 1, 2024.

*Primary Examiner* — Jacinta M Crawford
(74) *Attorney, Agent, or Firm* — Westbridge IP LLC

(57) ABSTRACT

Disclosed are an interface display method, a device and a storage medium. The method includes: obtaining a color-blind color of a current user and a current color replacement mode; determining a target color corresponding to the color-blind color when the current color replacement mode is a user-defined mode; and replacing the color-blind color displayed on a display interface of a smart device with the target color when the display interface is activated, and displaying the target color on the display interface. The present application determines the color-blind color of the current user and replaces the color-blind color with the target color which is determined in a specific color replacement mode, and finally no color-blind colors are displayed on the display interface, the viewing experience of the achromate is improved.

9 Claims, 3 Drawing Sheets

(56) References Cited

U.S. PATENT DOCUMENTS

| | | | | |
|---|---|---|---|---|
| 2016/0055657 A1* | 2/2016 | Beyrak | ............... | G06F 18/40 345/594 |
| 2016/0365017 A1* | 12/2016 | Park | ............... | G06F 3/0488 |
| 2017/0110089 A1* | 4/2017 | Douglas | ............... | G06F 3/04897 |
| 2022/0076590 A1* | 3/2022 | Beerana | ............... | G06T 11/001 |

FOREIGN PATENT DOCUMENTS

| | | |
|---|---|---|
| CN | 106488219 A | 3/2017 |
| CN | 109756718 A | 5/2019 |
| CN | 110728724 A | 1/2020 |
| CN | 111796889 A | 10/2020 |
| CN | 112801858 A | 5/2021 |

* cited by examiner

COLOR-BLIND COLOR INTERFACE DISPLAY METHOD, DEVICE AND STORAGE MEDIUM

CROSS-REFERENCE TO RELATED APPLICATIONS

The present application claims priority to Chinese Patent Application No. 202110771038.9, titled "Interface Display Method, Apparatus, Device and Storage Medium" and filed on Jul. 7, 2021, which is hereby incorporated for reference in its entirety for all purposes.

TECHNICAL FIELD

The present application relates to the technical field of smart devices, and in particular to an interface display method, an interface display apparatus, an interface display device and a storage medium.

BACKGROUND

At present, with the development of technology and economy, the smart devices are popularly and used widely. Currently, when achromate watch smart devices, they have a very poor experience of color-blind areas in smart devices. The colorful television pictures will become colorless for the achromate. The pictures in color-blind areas in smart devices are incongruous for the achromate. Thus, the achromate have a poor experience on the smart devices such as TVs, smart phones, tablets, etc.

The above content is only used to assist in understanding the technical solution of the present application, and does not mean that the above content is recognized as prior art.

SUMMARY

The main purpose of the present application is to provide an interface display method, an apparatus, a device and a storage medium, to solve the technical problem of poor experience on smart devices for the achromate in the related art.

In order to achieve the above purpose, the present application provides an interface display method, including: obtaining a color-blind color of a current user and a current color replacement mode; determining a target color corresponding to the color-blind color when the current color replacement mode is a user-defined mode; and replacing the color-blind color displayed on a display interface of a smart device with the target color when the display interface is activated, and displaying the target color on the display interface.

In one embodiment, before the obtaining the color-blind color of the current user and the current color replacement mode, further includes: obtaining color-blind color input instructions; and sending the color-blind color input instructions to a terminal device of the current user, and the terminal device determining the color-blind color of the current user based on the color-blind color input instructions and providing feedback.

In one embodiment, before the obtaining the color-blind color of the current user and the current color replacement mode, further includes: obtaining color-blind color detection instructions; sending the color-blind color detection instructions to a detection device of the current user, and the detection device performing a color-blind detection on the current user based on the color-blind color detection instructions to obtain a color-blind detection result; and determining the color-blind color of the current user based on the color-blind detection result and providing feedback.

In one embodiment, the determining the target color corresponding to the color-blind color when the current color replacement mode is the user-defined mode, includes: generating color-blind color adjustment instructions when the current color replacement mode is the user-defined mode; sending the color-blind color adjustment instructions to a terminal device of the current user, and the terminal device determining a color-blind adjustment color of the current user based on the color-blind color adjustment instructions; and determining the target color corresponding to the color-blind color based on the color-blind adjustment color.

In one embodiment, the replacing the color-blind color displayed on the display interface of the smart device with the target color when the display interface is activated, and displaying the target color on the display interface, includes: obtaining an initial picture quality parameter value corresponding to the color-blind color and a target picture quality parameter value corresponding to the target color; and replacing the initial picture quality parameter value with the target picture quality parameter value when the display interface of the smart device is activated, and displaying the target color on the display interface.

In one embodiment, after the obtaining the color-blind color of the current user and the current color replacement mode, further includes: obtaining a preset color-blind color mapping relationship table when the current color replacement mode is a system-defined mode; and querying the target color corresponding to the color-blind color according to the preset color-blind color mapping relationship table.

In one embodiment, before the obtaining the preset color-blind color mapping relationship table when the current color replacement mode is the system-defined mode, further includes: obtaining historical color replacement data and historical users' color-blind colors; and establishing the preset color-blind color mapping relationship table based on the historical color replacement data and the historical users' color-blind colors.

In addition, in order to achieve the above purpose, the present application also provides an interface display apparatus, including:
  an acquisition module configured for obtaining a color-blind color of a current user and a current color replacement mode;
  a determination module configured for determining a target color corresponding to the color-blind color when the current color replacement mode is a user-defined mode; and
  a replacement module configured for replacing the color-blind color displayed on a display interface of a smart device with the target color when the display interface is activated, and displaying the target color on the display interface.

In addition, in order to achieve the above purpose, the present application also provides an interface display device, including: a memory, a processor and an interface display program stored on the memory and operable on the processor, wherein the interface display program is configured to implement an interface display method as mentioned above.

In addition, in order to achieve the above purpose, the present application also provides a storage medium storing an interface display program, wherein the interface display program, when executed by the processor, implements an interface display method as mentioned above.

In the present application, the color-blind color of the current user and the current color replacement mode are obtained, when the current color replacement mode is a user-defined mode, the target color corresponding to the color-blind color is determined. When the display interface of the smart device is activated, the color-blind color displayed on the display interface is replaced with the target color, to make the display interface to display the target color. The present application determines the color-blind color of the current user and replaces the color-blind color with the target color which is determined in a specific color replacement mode, and finally no color-blind colors are displayed on the display interface, the viewing experience of the achromate is improved.

The realization of the purpose, functional features and advantages of the present application will be further described with reference to the drawings in conjunction with the embodiments.

DETAILED DESCRIPTION OF THE EMBODIMENTS

It should be understood that the specific embodiments described herein are used to only explain, but not to limit, the present application.

Figure 1:
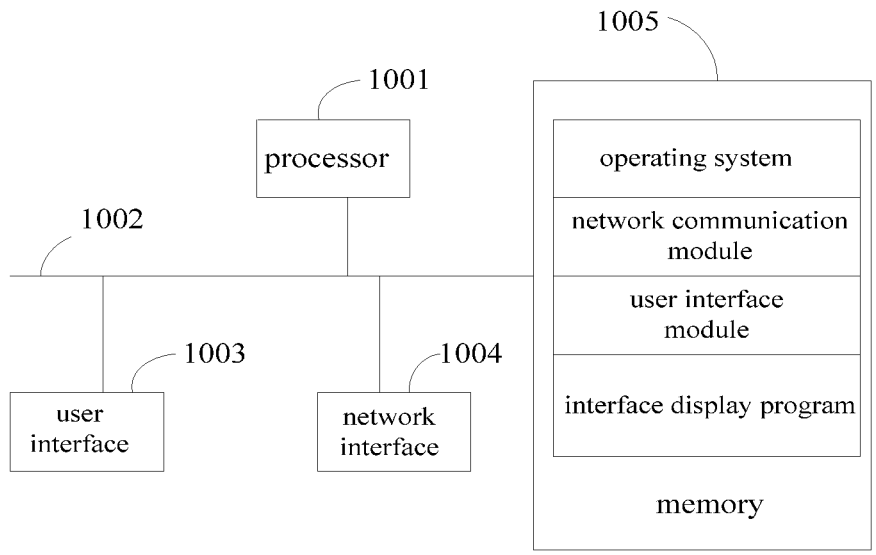
FIG. 1 is a structural schematic diagram of an interface display device of a hardware operating environment involved in an embodiment of the present application.

Referring to FIG. 1, FIG. 1 is a structural schematic diagram of an interface display device of a hardware operating environment involved in an embodiment of the present application.

As shown in FIG. 1, the interface display device may include: a processor 1001, such as a central processing unit (CPU), a communication bus 1002, a user interface 1003, a network interface 1004, and a memory 1005. The communication bus 1002 is used to implement the connection and communication among these components. The user interface 1003 may include a display, an input unit such as a keyboard. The user interface 1003 may also include a standard wired interface, and a wireless interface. The network interface 1004 can include a standard wired interface, a wireless interface (such as Wireless-Fidelity (Wi-Fi) interface). The memory 1005 can be a high-speed random access memory (RAM), or a stable non-volatile memory (NVM), such as a disk memory. The memory 1005 may also be a storage device independent of the aforementioned processor 1001.

It will be understood by those skilled in the art that the structure illustrated in FIG. 1 does not constitute a limitation on the interface display device, which may include more or fewer components than illustrated, or a combination of certain components, or a different arrangement of components.

As shown in FIG. 1, the memory 1005 as a storage medium may include an operating system, a network communication module, a user interface module, and an interface display program.

In the interface display device shown in FIG. 1, the network interface 1004 is mainly used for data communication with the network server. The user interface 1003 is mainly used for data interaction with the user. The processor 1001 and the memory 1005 in the interface display device of the present application can be provided in the interface display device, and the interface display device calls the interface display program stored in the memory 1005 through the processor 1001 and executes an interface display method provided by embodiments of the present application.

Figure 2:
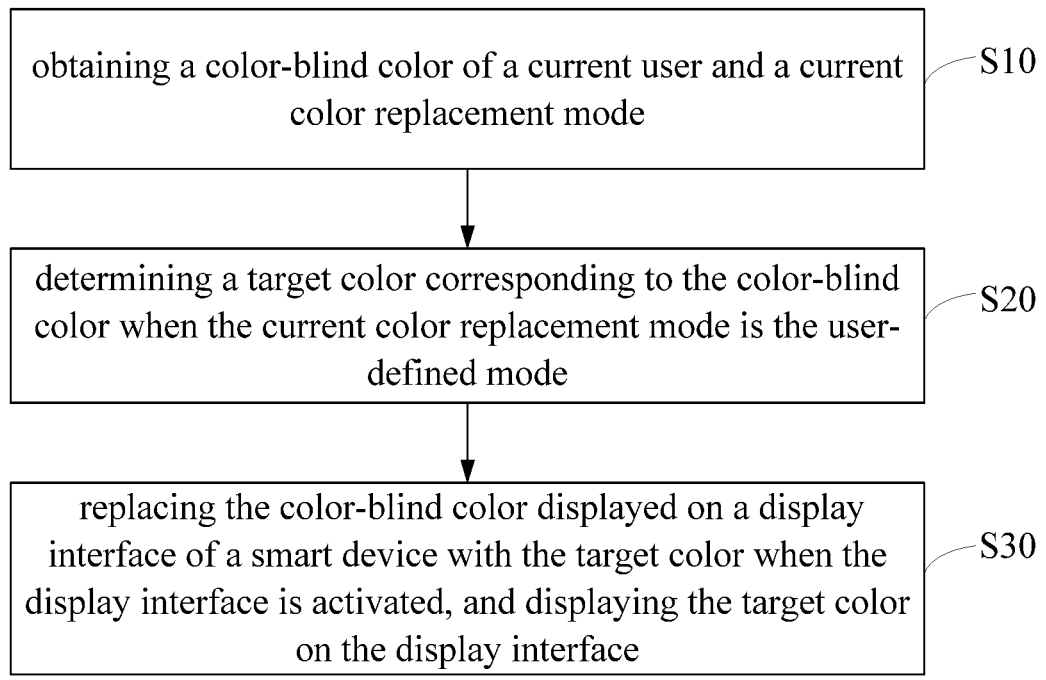
FIG. 2 is a flowchart of a first embodiment of an interface display method of the present application.

An embodiment of the present application provides an interface display method. Referring to FIG. 2, FIG. 2 shows a flowchart of a first embodiment of the interface display method of the present application.

In this embodiment, the interface display method includes:

Step S10: obtaining a color-blind color of a current user and a current color replacement mode.

It should be noted that the executive subject of this embodiment can be an interface display device, or be another device capable of achieving the same or similar functions, which are not limited herein. In this embodiment, the color-blind detection application is taken as an example to illustrate. The color-blind detection application can be pre-installed in the smart device.

It should be understood that the color-blind colors can be colors that cannot be identified or are confused by the achromate. If the color-blind color is red, the current user cannot identify red. If the color-blind color is green, the current user cannot identify green. If the color-blind color is blue-yellow, the current user confuses blue with yellow, which are not limited in this embodiment.

It should be understood that in order to obtain the color-blind color of the current user, types of the color-blind color of the current user needs to be detected. In the specific implementation process, it can include two detection methods, one is that the color-blind color is directly input into the terminal device of the current user, thus to obtain the color-blind color of the current user. The other is that the color-blind color is detected by the terminal device of the current user through the color pattern detection method, and then the color-blind color is determined and saved on the smart device.

It can be understood that the color-blind detection application also provides color-blind color replacement function. The current color replacement mode includes a user-defined mode and a system-defined mode. The user-defined mode can be the color replacement mode defined by the user. If the color-blind color of the current user is red, and the color replacement mode in user-defined mode set by the user can be that red is replaced with blue. The system-defined mode can be a default color replacement mode. If the color-blind color of the current user is red, the default color replacement mode in the system-defined mode is that red is replaced with yellow, which is not limited herein.

Step S20: determining a target color corresponding to the color-blind color when the current color replacement mode is a user-defined mode.

It should be noted that the target color can be used to replace a current color-blind color, that is, the color displayed in the color-blind color area of the display interface. Through obtaining the current color replacement mode which is the color replacement method set in the user-defined mode and the determined color-blind color of the current user, the target color corresponding to the color-blind color is determined according to the user-defined mode.

It should be understood that the color-blind color of the current user is red, and the color replacement method in the user-defined mode set by the user can be replacing red with blue, the target color is determined to be blue, which is not limited in this embodiment.

Step S30: replacing the color-blind color displayed on a display interface of a smart device with the target color when the display interface is activated, and displaying the target color on the display interface.

It should be understood that the smart device may be a mobile device such as a television, a cell phone, a tablet, etc., and the display interface may be the display screen of the smart device, which is not limited herein. By obtaining an initial picture quality (PQ) parameter value corresponding to the color-blind color and a target PQ parameter value corresponding to the target color, when the display interface of the smart device is activated, the initial PQ parameter value is replaced by the target PQ parameter value, to make the display interface display the target color, so that all colors of the pictures displayed on the display interface later can be seen by the current user, and color-blind colors are shielded.

In the embodiment, the color-blind color of the current user and the current color replacement mode are obtained, when the current color replacement mode is the user-defined mode, the target color corresponding to the color-blind color is determined. When the display interface of the smart device is activated, the color-blind color displayed on the display interface is replaced by the target color, to make the display interface to display the target color. The present application determines the color-blind color of the current user and replaces the color-blind color with the target color which is determined in a specific color replacement mode, and later no color-blind colors are displayed on the display interface, the viewing experience of the achromate is improved.

Figure 3:
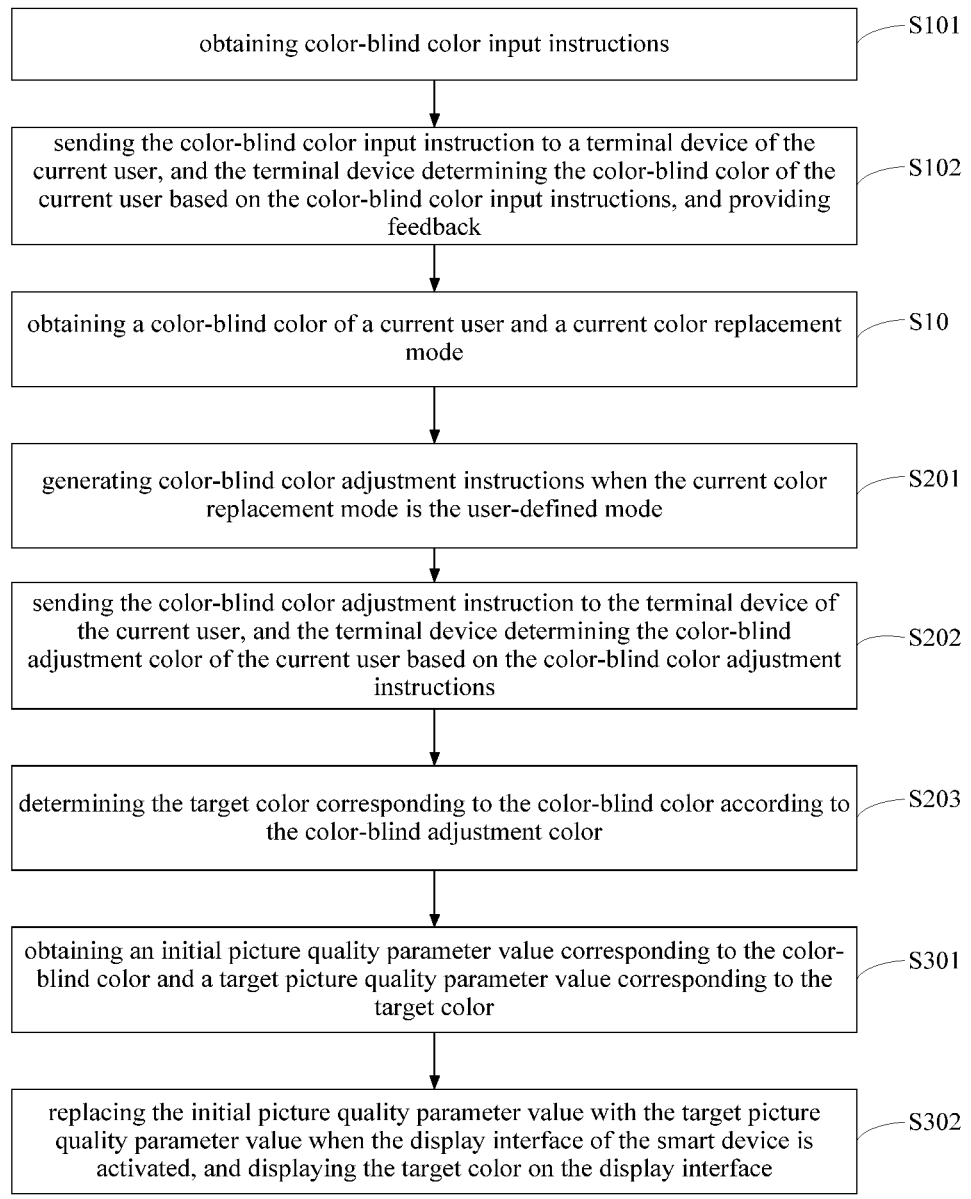
FIG. 3 is a flowchart of a second embodiment of the interface display method of the present application.

Referring to FIG. 3, FIG. 3 shows a flowchart of a second embodiment of the interface display method of the present application.

Based on the above first embodiment, before Step S10, the interface display method of the embodiment further includes:

Step S101: obtaining color-blind color input instructions.

Step S102: sending the color-blind color input instruction to a terminal device of the current user, and the terminal device determining the color-blind color of the current user based on the color-blind color input instructions, and providing feedback.

It should be understood that the color-blind color input instruction can be an instruction of directly inputting the color-blind color on the terminal device of the current user. The terminal device has a color-blind color input function. When the current user uses the terminal device, the color-blind color of the current user can be input into the terminal device. When the current user watches the display interface of the smart television, the color-blind color input instruction can be sent to the remote control of the smart television. The current user can input the color-blind color of the current user through the remote control, the color-blind color of the current user is fed to the color-blind detection application, and stored on the smart television.

Before Step S10, the method further includes: obtaining color-blind color detection instructions; sending the color-blind color detection instructions to a detection device of the current user, and the detection device performing color-blind detection on the current user based on the color-blind color detection instructions to obtain color-blind detection results; determining the color-blind color of the current user based on the color-blind detection results and providing feedback.

It should be understood that the color-blind color detection instruction may be an instruction for detecting the color-blind color of a user by a preset detection method. The preset detection method may be a color pattern detection method, which is not limited herein.

It should be noted that the color-blind detection instruction is obtained and sent to a corresponding detection device of the current user, and the corresponding detection device of the current user checks the color-blind color of the current user according to the color-blind color detection instruction to obtain the color-blind detection result, and the color-blind detection result can be analyzed to determine the color-blind color of the current user and feedback is provided. If the current user watches the display interface of the smart TV, the display interface can display the color pattern detected by performing the color-blind color detection. The current user can input the result of the color mode detection method through the remote control, to obtain the color-blind detection result. Therefore, the color-blind of the current user can be determined based on the detection results, fed to the color-blind detection application, and saved on the Smart TV.

Step S20 includes:

Step S201: generating color-blind color adjustment instructions when the current color replacement mode is the user-defined mode.

It should be understood that the color-blind color adjustment instruction may be an instruction to adjust a color-blind color in the user-defined mode. Thus, the color-blind color adjustment instruction is triggered in responding to a determining that the current color replacement mode is the user-defined mode.

Step S202: sending the color-blind color adjustment instruction to the terminal device of the current user, and the terminal device determining the color-blind adjustment color of the current user based on the color-blind color adjustment instructions.

It should be understood that the terminal device of the current user sets the color-blind adjustment color corresponding to the color-blind color according to the color-blind color adjustment instruction. If the user watches the display interface of the smart TV, the adjusted interface corresponding to the color-blind color adjustment instruction can be displayed on the display interface. In the case that the color-blind color of the current user is already known, the current user can input the adjustment color in the adjustment interface through the remote control to obtain the color-blind adjustment color.

Step S203: determining the target color corresponding to the color-blind color according to the color-blind adjustment color.

It should be understood that the color-blind adjustment colors and the target colors are in one-to-one correspondence. If the color-blind color of the current user is red and the color-blind adjustment color determined by the color-blind color adjustment instruction in the user-defined mode is blue, the corresponding target color is also blue.

Step S30 includes:

Step S301: obtaining an initial picture quality parameter value corresponding to the color-blind color and a target picture quality parameter value corresponding to the target color.

It can be understood that the picture quality parameter value can be a preset parameter value of each color, in the situation that the setting mode of picture quality parameter value is determined, the PQ parameter value of each color is fixed. In the specific implementation, the parameter value can be within 0 to 100, which is not limited herein. For example, in a determined setting mode of picture quality parameter value, the PQ parameter value of red can be 20, and the PQ parameter value of blue can be 40, which is not limited herein.

Step S302: replacing the initial picture quality parameter value with the target picture quality parameter value when the display interface of the smart device is activated, and displaying the target color on the display interface.

It should be understood that the initial PQ parameter value may be replaced with the target PQ parameter value when the display interface of the smart device is activated, such that when the display interface displays video pictures, the color-blind color in the video pictures is replaced with the target color. If the user watches the display interface of the smart TV and the color-blind color is red and the target color is blue, when the user activates the smart TV to watch the video interface, and red appears in the video interface, the picture quality parameter value 20 corresponding to red is replaced with the picture quality parameter value 40 corresponding to blue, so that red which should appear on the video picture area is replaced with blue for video playback, and finally all picture colors of the display interface can be seen by the current user, and the color-blind colors are shielded.

In the embodiment, the color-blind color input instruction is obtained, and sent to the terminal device of the current user, so that the terminal device can determine the color-blind color of the current user according to the color-blind color input instruction, and provide feedback. The color-blind color of the current user and the current color replacement mode are obtained. When the current color replacement mode is the user-defined mode, the color-blind color adjustment instruction is generated. The color-blind color adjustment instruction is sent to the terminal device of the current user, so that the terminal device determines the color-blind adjustment color of the current user according to the color-blind adjustment instructions, the target color corresponding to the color-blind color is determined according to the color-blind adjustment color. The initial picture quality parameter value corresponding to the color-blind color and the target picture quality parameter value corresponding to the target color are obtained. The initial picture quality parameter value is replaced with the target picture quality parameter value when the display interface of the smart device is activated, so that the display interface displays the target color. The color-blind color of the current user is determined, and the color-blind color is replaced with the target color, which is determined in the user-defined mode according to the specific color replacement mode. Finally, a display interface without color-blind color is presented, the effectiveness of the viewing experience of the achromate is improved.

Figure 4:
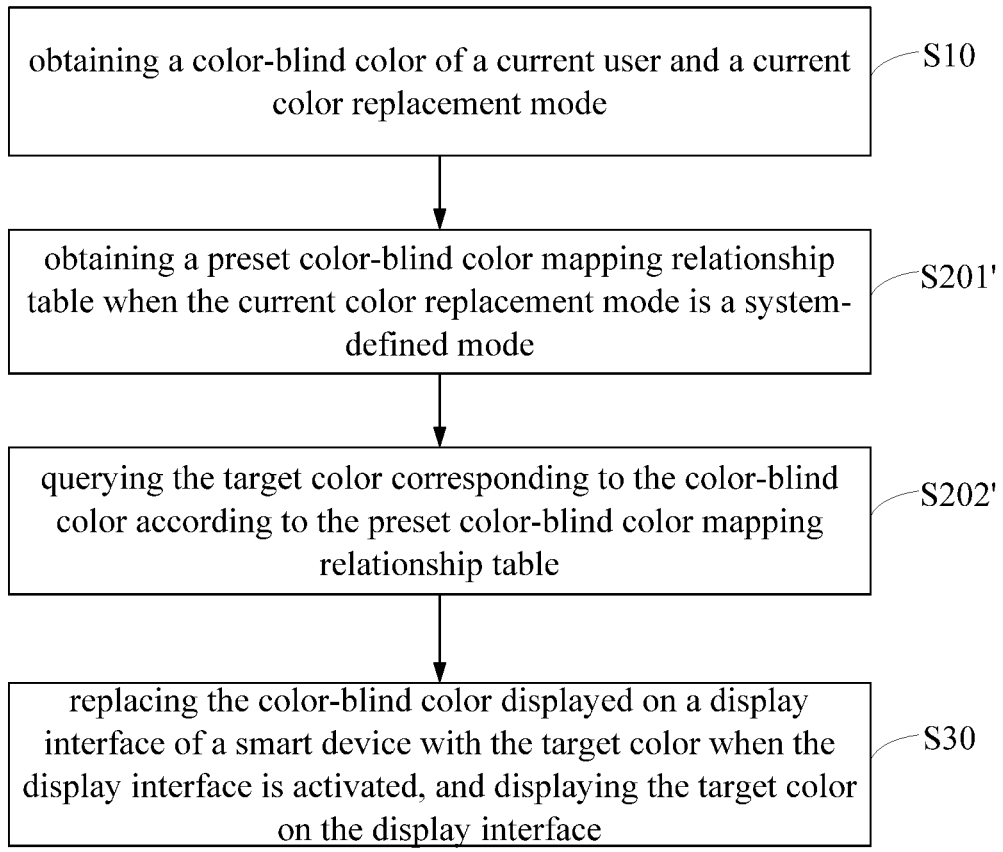
FIG. 4 is a flowchart of a third embodiment of the interface display method of the present application.

In an embodiment, as shown in FIG. 4, a third embodiment of the interface display method of the present application is proposed based on the first embodiment or the second embodiment. As illustrated based on the first embodiment, after Step S10, the method also includes:

Step S201': obtaining a preset color-blind color mapping relationship table when the current color replacement mode is a system-defined mode.

It should be understood that the preset color-blind color mapping relationship table may be correspondences between color-blind colors and target colors, so that a default preset color-blind color mapping relationship table of the smart device is obtained when the determined current color replacement mode is a system-defined mode.

Before Step S201', the method further includes: obtaining historical color replacement data and historical users' color-blind colors; establishing a preset color-blind color mapping relationship table based on the historical color replacement data and the historical users' color-blind colors.

It should be understood that, in the specific implementation, if there are a large number of users to select the color-blind color replacement colors in the user-defined mode to replace the colors, historical users' color-blind colors and their corresponding historical color replacement data can be counted by big data, to establish a preset color-blind color mapping relationship table. When the historical users' color-blind colors are red, there are 5 users in the corresponding historical color replacement data to set blue to replace red, and 10 users to set yellow to replace red, so it can be seen that there are more users to set yellow to replace red, thus the preset color-blind color mapping relationship table, in which the color-blind color is red and the target color is yellow, can be established, which is not limited herein.

Step S202: querying the target color corresponding to the color-blind color according to the preset color-blind color mapping relationship table.

It should be noted that the target color corresponding to the color-blind color can be queried in the preset color-blind color mapping relationship table, based on the known color-blind color.

In this embodiment, the color-blind color of the current user and the current color replacement mode are obtained. When the current color replacement mode is a system-defined mode, a preset color-blind color mapping relationship table is obtained, the target color corresponding to the color-blind color is queried in the preset color-blind color mapping relationship table. The color-blind color displayed on the display interface is replaced with the target color when the display interface of the smart device is activated, and the display interface displays the target color. The color-blind color of the current user is determined and the color-blind color is replaced with the target color, which is determined in the system-defined mode according to a specific color replacement mode. Finally, a display interface without color-blind color is presented, the accuracy of the viewing experience of the achromate is improved.

In addition, an embodiment of the present application also present a storage medium storing an interface display program, the interface display program, when executed by a processor, implements the steps of the interface display method as described above.

Since the present storage medium employs all the technical solutions of all the above embodiments, it has at least all the beneficial effects brought about by the technical solutions of the above embodiments, which will not be repeated herein.

Figure 5:
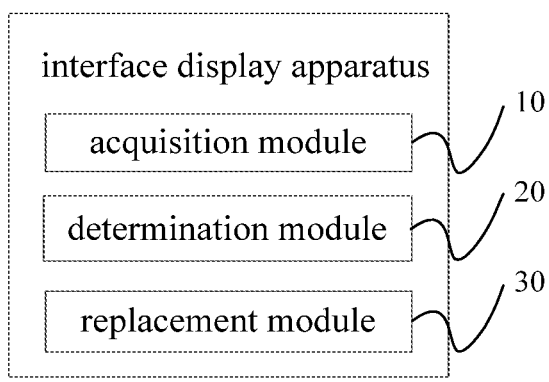
FIG. 5 is a structural block diagram of a first embodiment of an interface display device of the present application.

Referring to FIG. 5, FIG. 5 shows a structural block diagram of the first embodiment of the interface display device of the present application.

As shown in FIG. 5, the interface display apparatus proposed in the embodiment of the present application includes: an acquisition module 10 configured for obtaining a color-blind color of a current user and a current color replacement mode.

It should be understood that the color-blind colors can be colors that cannot be identified or are confused by the achromate. If the color-blind color is red, the current user cannot identify red. If the color-blind color is green, the current user cannot identify green. If the color-blind color is blue-yellow, the current user confuses blue with yellow, which are not limited in this embodiment.

It should be understood that in order to obtain the color-blind color of the current user, types of the color-blind color of the current user needs to be detected. In the specific implementation process, it can include two detection methods, one is that the color-blind color is directly input into the terminal device of the current user, to obtain the color-blind color of the current user. The other is that the color-blind color is detected by the terminal device of the current user through the color pattern detection method, to determine the color-blind color and saved the color-blind color on the smart device.

It can be understood that the color-blind detection application also provides color-blind color replacement function, the current color replacement mode includes a user-defined mode and a system-defined mode, the user-defined mode can be the color replacement mode defined by the user's own. If the color-blind color of the current user is red, and the color replacement mode in user-defined mode set by the user's own can be that the red is replaced with blue. The system-defined mode can be a system default color replacement mode. If the color-blind color of the current user is red, the system default color replacement mode in the system-defined mode is that the red is replaced with the yellow, which is not limited herein.

A determination module 20 configured for determining the target color corresponding to the color-blind color when the current color replacement mode is a user-defined mode.

It should be noted that the target color can be used to replace the color-blind color, that is, the color displayed in the color-blind color area of the display interface. The current color replacement mode which is the color replacement method set in the user-defined mode and the determined color-blind color of the current user are obtained, the target color corresponding to the color-blind color is determined according to the user-defined mode.

It should be understood that the color-blind color of the current user is red, and the color replacement method in the user-defined mode set by the user can be that the red is replaced with blue, the target color is determined to be blue, which is not limited in this embodiment.

A replacement module 30 is configured for replacing the color-blind color displayed on a display interface of a smart device with the target color when the display interface is activated, and displaying the target color on the display interface.

It should be understood that the smart device may be a mobile device such as a television, a cell phone, a tablet, etc., and the display interface may be the display screen of the smart device, which is not limited herein. By obtaining an initial picture quality (PQ) parameter value corresponding to the color-blind color and the target PQ parameter value corresponding to the target color, when the display interface of the smart device is activated, the initial PQ parameter value is replaced with the target PQ parameter value, to make the display interface display the target color, so that finally all colors of the pictures displayed on the display interface can be seen by the current user, and color-blind colors are shielded.

In the embodiment, the color-blind color of the current user and the current color replacement mode are obtained, when the current color replacement mode is a user-defined mode, the target color corresponding to the color-blind color is determined. When the display interface of the smart device is activated, the color-blind color displayed on the display interface is replaced with the target color, to make the display interface to display the target color. The present application determines the color-blind color of the current user and replaces the color-blind color with the target color which is determined in a specific color replacement mode, and finally no color-blind colors are displayed on the display interface, the viewing experience of the achromate is improved.

In an embodiment, the acquisition module 10 is further configured for: obtaining color-blind color input instructions; and sending the color-blind color input instructions to a terminal device of the current user, and the terminal device determining the color-blind color of the current user based on the color-blind color input instructions and providing feedback.

In an embodiment, the acquisition module 10 is further configured for: obtaining color-blind color detection instructions; sending the color-blind color detection instructions to a detection device of the current user, and the detection device performing a color-blind detection on the current user based on the color-blind color detection instructions to obtain a color-blind detection result; and determining the color-blind color of the current user based on the color-blind detection result and providing feedback.

In an embodiment, the determination module 20 is further configured for: generating color-blind color adjustment instructions when the current color replacement mode is a user-defined mode; sending the color-blind color adjustment instructions to a terminal device of the current user, and the terminal device determining a color-blind adjustment color of the current user based on the color-blind color adjustment instructions; and determining the target color corresponding to the color-blind color based on the color-blind adjustment color.

In an embodiment, the replacement module 30 is further configured for obtaining an initial picture quality parameter value corresponding to the color-blind color and a target picture quality parameter value corresponding to the target color; and replacing the initial picture quality parameter value with the target picture quality parameter value when the display interface of the smart device is activated, and displaying the target color on the display interface.

In an embodiment, the determination module 20 further configured for obtaining a preset color-blind color mapping relationship table when the current color replacement mode is a system-defined mode; and querying the target color corresponding to the color-blind color according to the preset color-blind color mapping relationship table.

In an embodiment, the acquisition module 10 is further configured for obtaining historical color replacement data and historical users' color-blind colors; and establishing the preset color-blind color mapping relationship table based on the historical color replacement data and the historical users' color-blind colors.

Other embodiments or specific implementation methods of the interface display device described in the present application can be referred to each of the above method embodiments, and thus it has at least all the beneficial effects brought from the technical solutions of the above embodiments, which will not be repeated here.

It should be understood that the above is only an example, and does not constitute any limitation to the technical solution of the present application, which can be set as needed by those skilled in the art in specific applications, without any limitation to the present application.

It should be noted that the workflow described above is only schematic and does not limit the claimed scope of the present application. In practical application, those skilled in the art can select some or all of them to achieve the purpose of this embodiment according to the actual needs, which is not limited here.

In addition, the technical details not described in this embodiment can be found in the interface display method provided by any embodiment of the present application, which will not be repeated here.

In addition, it should be noted that herein the terms "including", "comprising" or any other variation thereof are intended to cover non-exclusive inclusion such that a process, a method, an article, or a system that includes a set of elements includes not only those elements, but also includes other elements that are not explicitly listed or that are inherent to such process, method, article, or system. Without further limitation, an element defined by the statement "including a . . . " does not preclude the existence of additional identical elements in the process, a method, an article, or a system that includes that element.

The above numbers of the embodiments of the present application is for descriptive purposes only and does not represent the merits of the embodiments.

From the above description of the embodiments, it will be clear to those skilled in the art that the above embodiment method can be implemented by the software plus the necessary common hardware platform, or of course by hardware, but in many cases the former is the better way of implementation. Based on this understanding, the technical solution of the present application, in essence or as a contribution to the related art, may be embodied in the form of a software product, which is stored in a storage medium (e.g., a read only memory (ROM)/RAM, a diskette, an optical disc) and includes a number of instructions to enable a terminal device (which may be a cell phone, a computer, a server, or a network device, etc.) to perform the method described in various embodiments of the present application.

The above mentioned is only a preferred embodiment of the present application, but not to limit the claimed scope of the present application. Any equivalent structural transformation made by using the content of the specification and the drawings of the present application, or direct/indirect application in other related technical fields are included in the claimed scope of the present application.

The invention claimed is:

1. An interface display method, comprising:
obtaining a color-blind color of a current user and a current color replacement mode;
determining a target color corresponding to the color-blind color when the current color replacement mode is a user-defined mode; and
replacing the color-blind color displayed on a display interface of a smart device with the target color when the display interface is activated, and displaying the target color on the display interface,
wherein the replacing the color-blind color displayed on the display interface of the smart device with the target color when the display interface is activated, and displaying the target color on the display interface comprises:
obtaining an initial picture quality parameter value corresponding to the color-blind color and a target picture quality parameter value corresponding to the target color; and
replacing the initial picture quality parameter value with the target picture quality parameter value when the display interface of the smart device is activated, and displaying the target color on the display interface,
wherein both the initial picture quality parameter value and the target picture quality parameter value comprise a preset parameter value of each color, the preset parameter value of each color is set within 0 to 100, and after the obtaining the color-blind color of the current user and the current color replacement mode, the method further comprises:
obtaining a preset color-blind color mapping relationship table when the current color replacement mode is a system-defined mode; and
querying the target color corresponding to the color-blind color according to the preset color-blind color mapping relationship table.

2. The interface display method according to claim 1, wherein before the obtaining the color-blind color of the current user and the current color replacement mode, the method further comprises:
obtaining color-blind color input instructions; and
sending the color-blind color input instructions to a terminal device of the current user, and the terminal device determining the color-blind color of the current user based on the color-blind color input instructions and providing feedback.

3. The interface display method according to claim 2, wherein the determining the target color corresponding to the color-blind color when the current color replacement mode is the user-defined mode comprises:
generating color-blind color adjustment instructions when the current color replacement mode is the user-defined mode;
sending the color-blind color adjustment instructions to a terminal device of the current user, and the terminal device determining a color-blind adjustment color of the current user based on the color-blind color adjustment instructions; and
determining the target color corresponding to the color-blind color based on the color-blind adjustment color.

4. The interface display method according to claim 1, wherein before the obtaining the color-blind color of the current user and the current color replacement mode, the method further comprises:
obtaining color-blind color detection instructions;
sending the color-blind color detection instructions to a detection device of the current user, and the detection device performing a color-blind detection on the current user based on the color-blind color detection instructions to obtain a color-blind detection result; and
determining the color-blind color of the current user based on the color-blind detection result and providing feedback.

5. The interface display method according to claim 4, wherein the determining the target color corresponding to the color-blind color when the current color replacement mode is the user-defined mode comprises:
generating color-blind color adjustment instructions when the current color replacement mode is the user-defined mode;
sending the color-blind color adjustment instructions to a terminal device of the current user, and the terminal device determining a color-blind adjustment color of the current user based on the color-blind color adjustment instructions; and
determining the target color corresponding to the color-blind color based on the color-blind adjustment color.

6. The interface display method according to claim 1, wherein the determining the target color corresponding to the color-blind color when the current color replacement mode is the user-defined mode comprises:

generating color-blind color adjustment instructions when the current color replacement mode is the user-defined mode;

sending the color-blind color adjustment instructions to a terminal device of the current user, and the terminal device determining a color-blind adjustment color of the current user based on the color-blind color adjustment instructions; and determining the target color corresponding to the color-blind color based on the color-blind adjustment color.

7. The interface display method according to claim 1, wherein before the obtaining the preset color-blind color mapping relationship table when the current color replacement mode is the system-defined mode, the method further comprises:

obtaining historical color replacement data and historical users' color-blind colors; and establishing the preset color-blind color mapping relationship table based on the historical color replacement data and the historical users' color-blind colors.

8. An interface display device, comprising: a memory, a processor and an interface display program stored on the memory and operable on the processor, wherein the interface display program is configured to implement the interface display method according to claim 1.

9. A non-transitory storage medium storing an interface display program, wherein the interface display program, when executed by the processor, implements the interface display method according to claim 1.

\* \* \* \* \*